US012257671B2

(12) United States Patent
Lottes-Paukner et al.

(10) Patent No.: US 12,257,671 B2
(45) Date of Patent: Mar. 25, 2025

(54) POWER TOOL WITH BATTERY VIBRATION MITIGATION

(71) Applicant: MILWAUKEE ELECTRIC TOOL CORPORATION, Brookfield, WI (US)

(72) Inventors: Joseph T. Lottes-Paukner, Sussex, WI (US); Michael R. Sande, Waukesha, WI (US); Joseph J. Drees, Wauwatosa, WI (US); Scott R. Fischer, Menomonee Falls, WI (US); Jacob P. Schneider, Cedarburg, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/210,741

(22) Filed: Jun. 16, 2023

(65) Prior Publication Data

US 2023/0405790 A1 Dec. 21, 2023

Related U.S. Application Data

(60) Provisional application No. 63/352,671, filed on Jun. 16, 2022.

(51) Int. Cl.
*B25B 21/02* (2006.01)
*B25F 5/00* (2006.01)

(52) U.S. Cl.
CPC .............. *B25B 21/02* (2013.01); *B25F 5/006* (2013.01)

(58) Field of Classification Search
CPC ................................ B25B 21/02; B25F 5/006
See application file for complete search history.

(56) References Cited

U.S. PATENT DOCUMENTS 4,835,410 A * 5/1989 Bhagwat .................. H02J 7/02 307/64
5,157,807 A 10/1992 Keller et al.
5,208,525 A 5/1993 Lopic et al.
5,401,591 A 3/1995 Bishay et al.
5,401,592 A 3/1995 Gilpin et al.
5,441,828 A 8/1995 Akazawa
5,553,675 A 9/1996 Pitzen et al.
(Continued)

FOREIGN PATENT DOCUMENTS

CN 203746928 U 7/2014
CN 207696473 U 8/2018
(Continued)

OTHER PUBLICATIONS

US 10,576,615 B2, 03/2020, Aoki (withdrawn)

*Primary Examiner* — Nathaniel C Chukwurah
(74) *Attorney, Agent, or Firm* — Michael Best & Friedrich LLP

(57) ABSTRACT

A power tool includes a housing with a motor housing portion and a handle portion extending from the motor housing portion, a motor supported within the motor housing portion, a drive assembly operatively coupled to the motor, the drive assembly producing vibrations during operation of the power tool, a battery receptacle located within the handle portion, a battery at least partially insertable into the battery receptacle along a battery axis, the battery configured to provide power to the motor, and a vibration mitigation system configured to reduce transmission of the vibrations produced by the drive assembly to the battery.

20 Claims, 6 Drawing Sheets

(56) References Cited

U.S. PATENT DOCUMENTS

| | | | |
|---|---|---|---|
| 5,692,574 A | 12/1997 | Terada | |
| 5,769,657 A | 6/1998 | Kondo et al. | |
| 5,843,595 A | 12/1998 | Kawakatsu | |
| 5,927,407 A | 7/1999 | Gwinn et al. | |
| 6,026,910 A | 2/2000 | Masterson et al. | |
| 6,066,938 A | 5/2000 | Hyodo et al. | |
| 6,220,367 B1 | 4/2001 | Masterson et al. | |
| 6,350,149 B1 | 2/2002 | Nakane | |
| 6,460,626 B2 | 10/2002 | Carrier | |
| 6,502,949 B1 | 1/2003 | Horiyama et al. | |
| 6,641,634 B2 | 11/2003 | Reich et al. | |
| 6,656,626 B1 | 12/2003 | Mooty et al. | |
| 6,840,335 B1 | 1/2005 | Wu | |
| 7,429,189 B2 | 9/2008 | Lerch | |
| 7,429,430 B2 | 9/2008 | Mooty et al. | |
| 7,492,125 B2 | 2/2009 | Serdynski et al. | |
| RE40,681 E | 3/2009 | Pitzen et al. | |
| 7,496,989 B2 | 3/2009 | Walker et al. | |
| 7,504,176 B2 | 3/2009 | Axelrod | |
| RE40,848 E | 7/2009 | Pitzen et al. | |
| 7,589,500 B2 | 9/2009 | Johnson et al. | |
| 7,686,853 B2 | 3/2010 | Seman, Jr. et al. | |
| 7,721,818 B2 | 5/2010 | Inagawa et al. | |
| 7,766,097 B2 | 8/2010 | Kondo | |
| 7,828,185 B2 | 11/2010 | Hofmann et al. | |
| 7,858,219 B2 | 12/2010 | Agehara et al. | |
| 7,879,479 B2 | 2/2011 | Roehm et al. | |
| 7,944,181 B2 | 5/2011 | Johnson et al. | |
| 8,062,060 B2 | 11/2011 | Rejman | |
| 8,092,932 B2 | 1/2012 | Phillips et al. | |
| 8,123,098 B2 | 2/2012 | Miyata | |
| 8,148,000 B2 | 4/2012 | Furuta et al. | |
| 8,225,978 B2 | 7/2012 | Gross et al. | |
| 8,240,395 B2 | 8/2012 | Kamegai et al. | |
| 8,278,877 B2 | 10/2012 | Murayama et al. | |
| 8,557,427 B2 | 10/2013 | Matsumoto | |
| 9,004,191 B2 | 4/2015 | Müller et al. | |
| 9,073,563 B2 | 7/2015 | Middleton et al. | |
| 9,168,652 B2 | 10/2015 | Schadow et al. | |
| 9,461,281 B2 * | 10/2016 | Wackwitz ......... | H01M 10/0525 |
| 9,782,885 B2 | 10/2017 | Yoshikane et al. | |
| 9,999,967 B2 | 6/2018 | Furusawa et al. | |
| 10,040,178 B2 | 8/2018 | Kondo et al. | |
| 10,076,833 B2 | 9/2018 | Tada et al. | |
| 10,276,844 B2 | 4/2019 | Wackwitz et al. | |
| 10,654,161 B2 | 5/2020 | Aoki | |
| 10,828,765 B2 | 11/2020 | Aoki | |
| 10,857,660 B2 | 12/2020 | Aoki | |
| 11,027,349 B2 | 6/2021 | Ling et al. | |
| 2005/0058890 A1 | 3/2005 | Brazell et al. | |
| 2008/0124615 A1 | 5/2008 | Matsumoto | |
| 2008/0226971 A1 | 9/2008 | Stickel | |
| 2009/0286143 A1 | 11/2009 | Matthias et al. | |
| 2010/0209759 A1 | 8/2010 | Rejman et al. | |
| 2010/0314147 A1 | 12/2010 | Müller et al. | |
| 2011/0042117 A1 | 2/2011 | Doege et al. | |
| 2012/0118599 A1 | 5/2012 | Schadow et al. | |
| 2012/0171539 A1 * | 7/2012 | Rejman .................. | B25F 5/006 429/100 |
| 2012/0251857 A1 | 10/2012 | Neuhold et al. | |
| 2012/0291294 A1 | 11/2012 | Middleton et al. | |
| 2016/0001433 A1 | 1/2016 | Furusawa et al. | |
| 2020/0215679 A1 | 7/2020 | Tamura et al. | |

FOREIGN PATENT DOCUMENTS

| | | | |
|---|---|---|---|
| CN | 209158297 | U | 7/2019 |
| CN | 110185741 | A | 8/2019 |
| CN | 209206525 | U | 8/2019 |
| CN | 210770015 | U | 6/2020 |
| CN | 215395059 | U | 1/2022 |
| DE | 4000861 | A1 | 7/1991 |
| DE | 4142699 | A1 | 6/1993 |
| DE | 4211316 | A1 | 10/1993 |
| DE | 10003247 | A1 | 8/2000 |
| DE | 10244793 | A1 | 4/2004 |
| DE | 10318947 | A1 | 11/2004 |
| DE | 10242738 | A1 | 1/2005 |
| DE | 102004032790 | A1 | 2/2006 |
| DE | 102005019140 | A1 | 11/2006 |
| DE | 10066273 | B4 | 12/2006 |
| DE | 102005038088 | A1 | 2/2007 |
| DE | 102009002981 | A1 | 11/2010 |
| DE | 102005052428 | B4 | 6/2015 |
| EP | 0995553 | A2 | 4/2000 |
| EP | 1832396 | A1 | 9/2007 |
| EP | 2058088 | A2 | 5/2009 |
| EP | 3778131 | A1 | 2/2021 |
| GB | 2432036 | A | 5/2007 |
| JP | 2549389 | Y2 | 9/1997 |
| JP | H10296660 | A | 11/1998 |
| JP | 2000156212 | A | 6/2000 |
| JP | 2000296480 | A | 10/2000 |
| JP | 2001325932 | A | 11/2001 |
| JP | 2004160235 | A | 6/2004 |
| JP | 2006281441 | A | 10/2006 |
| JP | 3916962 | B2 | 5/2007 |
| WO | 2004016399 | A1 | 2/2004 |
| WO | 2011060512 | A1 | 5/2011 |
| WO | 2011148789 | A1 | 12/2011 |
| WO | 2020148026 | A1 | 7/2020 |

* cited by examiner

POWER TOOL WITH BATTERY VIBRATION MITIGATION

CROSS-REFERENCE TO RELATED APPLICATION

This application claims priority to U.S. Provisional Patent Application No. 63/352,671, filed Jun. 16, 2022, the entire contents of which are incorporated by reference herein.

FIELD OF THE DISCLOSURE

The present disclosure relates to power tools, and more particularly to rotary impact tools, such as impact wrenches.

BACKGROUND OF THE DISCLOSURE

Power tools may produce vibration during operation that can negatively impact the performance and service life of a connected battery. In particular, rotary impact tools, such as impact drivers and impact wrenches, may produce vibration due to reciprocation of a hammer within the tool and periodic impacts between the hammer and an anvil. Such vibration can cause wear and intermittent connection between the battery and battery terminals on the tool. Vibration can also cause wear on a latching mechanism of the battery, which can result in the battery decoupling from its receptacle. Accordingly, a need exists for a vibration mitigation system able to mitigate the effects of vibration on a battery connected to a power tool. A further need exists for a vibration mitigation system able to reduce vibration experienced and transferred to a user of such a power tool.

SUMMARY OF THE DISCLOSURE

The present disclosure provides, in one aspect, a power tool including a housing with a motor housing portion and a handle portion extending from the motor housing portion, a motor supported within the motor housing portion, a drive assembly operatively coupled to the motor, the drive assembly producing vibrations during operation of the power tool, a battery receptacle located within the handle portion, a battery at least partially insertable into the battery receptacle along a battery axis, the battery configured to provide power to the motor, and a vibration mitigation system configured to reduce transmission of the vibrations produced by the drive assembly to the battery.

The present disclosure provides, in another aspect, a power tool including a housing with a motor housing portion, an upper handle portion extending from the motor housing portion, and a lower handle portion coupled to the upper handle portion, a motor supported within the motor housing portion, a drive assembly operatively coupled to the motor, the drive assembly producing vibrations during operation of the power tool, a battery receptacle located within the lower handle portion, a battery at least partially insertable into the battery receptacle along a battery axis, the battery configured to provide power to the motor, and a vibration mitigation system configured to reduce transmission of the vibrations produced by the drive assembly from the upper handle portion to the lower handle portion. The vibration mitigation system includes a damping element configured to dampen vibration in a direction along the battery axis and in all directions perpendicular to the battery axis.

The present disclosure provides, in another aspect, a power tool including a housing with a motor housing portion and a handle portion extending from the motor housing portion, a motor supported within the motor housing portion, a drive assembly operatively coupled to the motor, the drive assembly producing vibrations during operation of the power tool, a battery receptacle located within the handle portion, a battery at least partially insertable into the battery receptacle along a battery axis, the battery configured to provide power to the motor, and a vibration mitigation system configured to reduce transmission of the vibrations produced by the drive assembly from the handle portion to the battery. The vibration mitigation system includes a damping element configured to dampen vibration along the battery axis and in a direction perpendicular to the battery axis.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
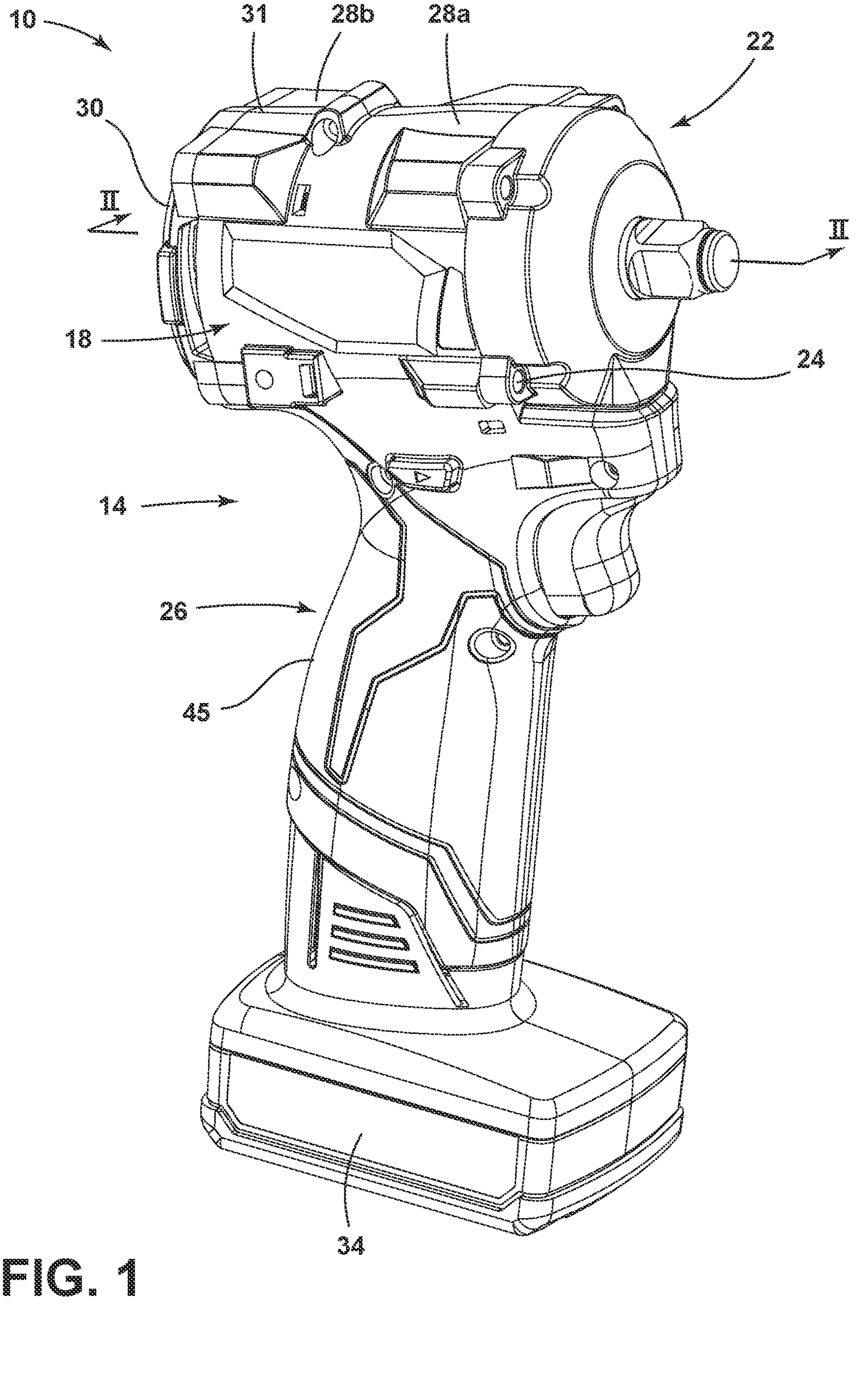
FIG. 1 is a perspective view of a power tool including a battery vibration mitigation system according to an embodiment of the disclosure.

FIG. 1 illustrates an embodiment of a power tool in the form of a rotary impact tool, and, more specifically, an impact wrench 10. The impact wrench 10 includes a housing 14 with a motor housing portion 18, an impact case or front housing portion 22 coupled to the motor housing portion 18 (e.g., by a plurality of fasteners 24), and a handle portion 26 extending downwardly from the motor housing portion 18. In the illustrated embodiment, the handle portion 26 and the motor housing portion 18 are defined by a first clamshell half 28*a* and a cooperating second clamshell half **28*b* (i.e., a first housing portion and a second housing portion). In the illustrated embodiment, the clamshell halves 28*a*, 28*b* are made of a polymer material (which may be a fiber-reinforced polymer material), whereas the front housing portion 22 is made of metal and integrally formed as a single piece (e.g., via a molding process such as casting or powdered metal compaction and sintering). In some embodiments, the front housing portion 22 may be made of the same material as the clamshell halves 28*a*, 28*b* or a different material. Alternatively, the front housing portion 22** may be omitted.

Figure 4:
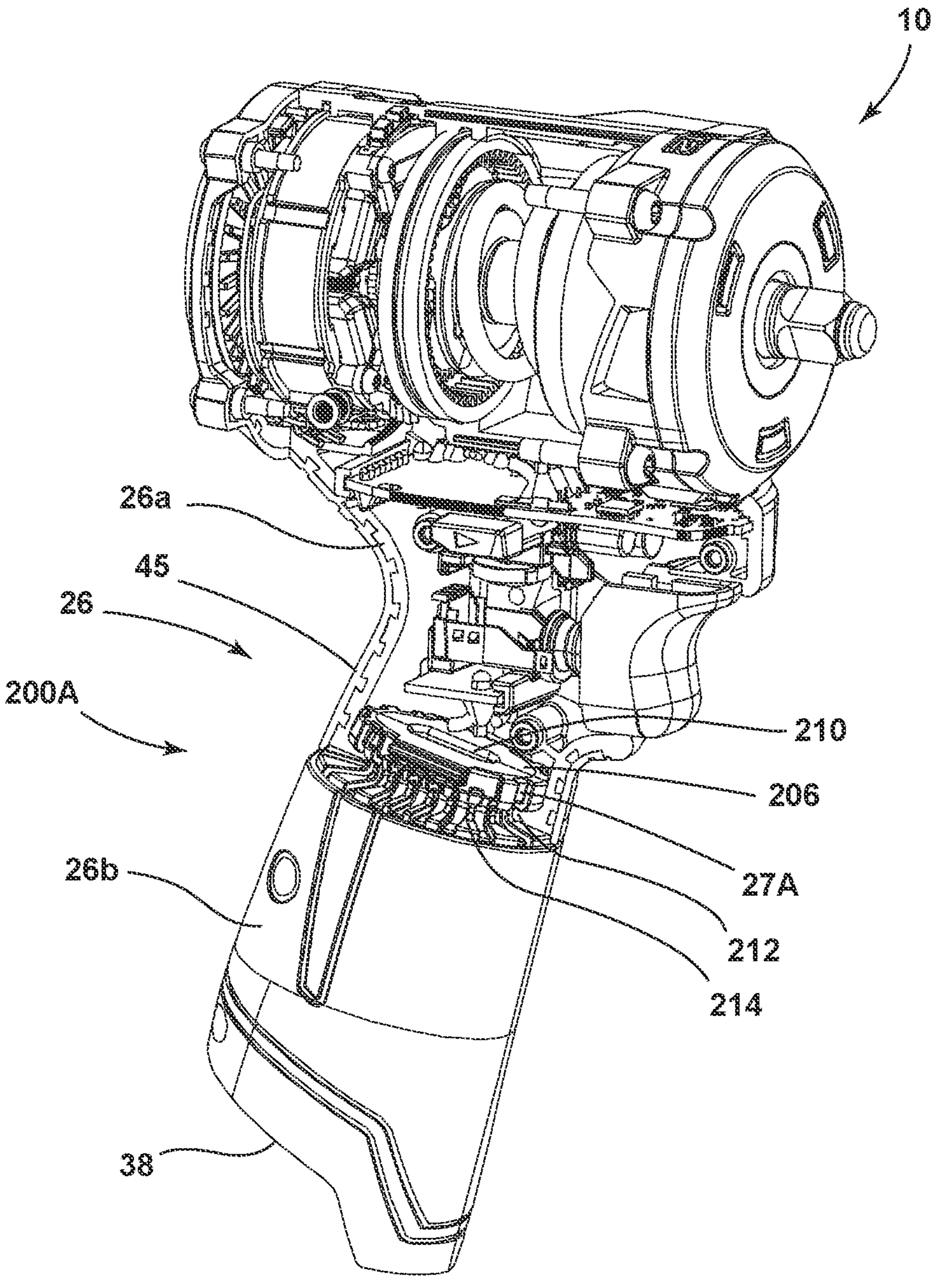
FIG. 4 is a perspective view of the power tool of FIG. 3, with a housing portion of the power tool hidden.

The illustrated housing 14 also includes an end cap 30 coupled to the motor housing portion 18 opposite the front housing portion 22. The first and second housing portions **28*a*, 28*b* can be coupled (e.g., fastened) together at an interface or seam 31 along a parting plane between the clamshell halves 28*a*, 28*b*. In the illustrated embodiment, the end cap 30 is continuous and may be pressed or fitted over a rear end of the clamshell halves 28*a*, 28*b*. In other words, the end cap 30 may not include two halves such that the end cap 30 may extend over the seam 31. The end cap 30 is coupled to the motor housing portion 18 by a plurality of fasteners 120 (FIG. 4). In yet other embodiments, the impact wrench 10 may not include a separate end cap, such that the clamshell halves 28*a*, 28*b* instead define the rear end of the motor housing portion 18**.

Figure 2:
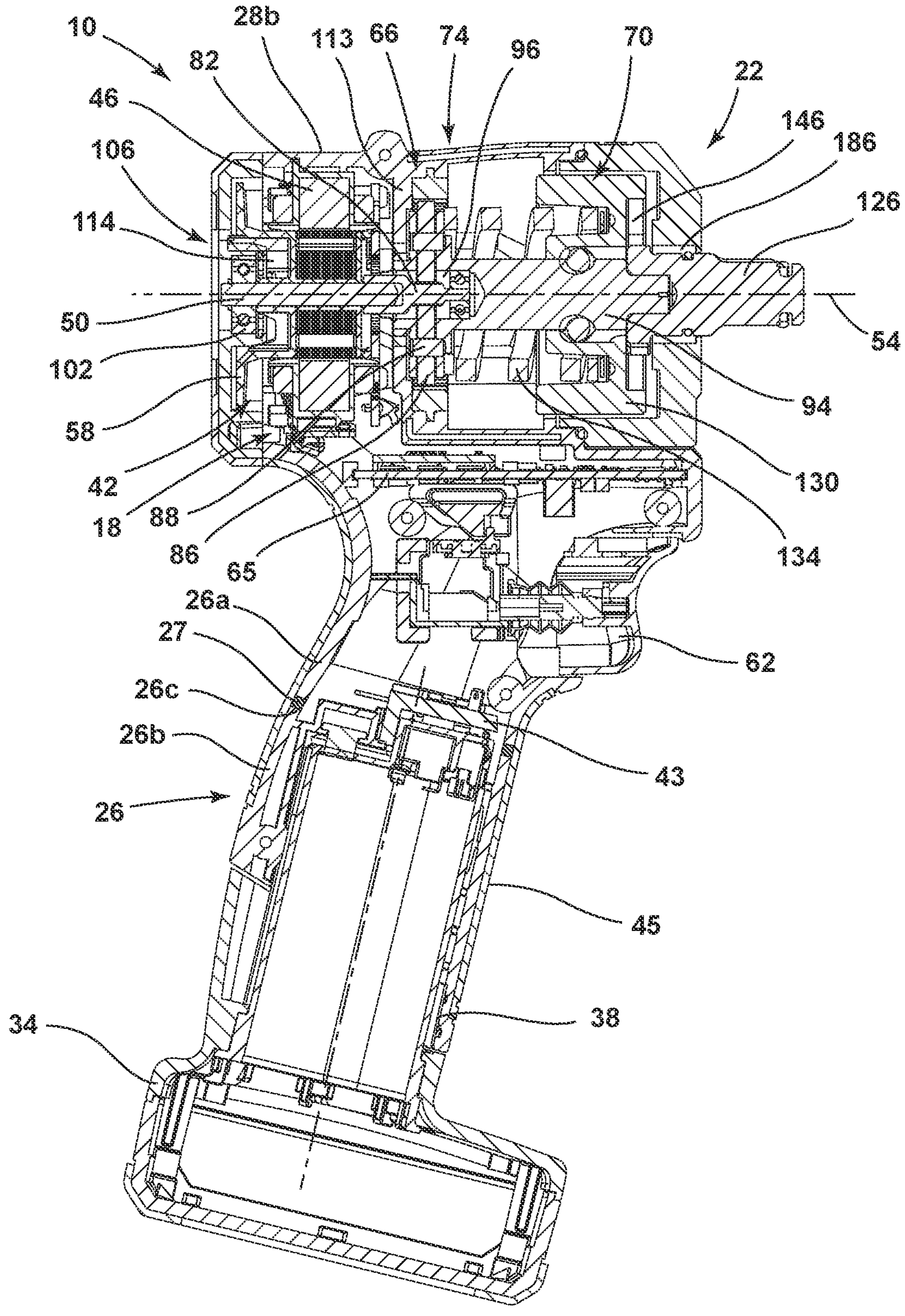
FIG. 2 is a cross-sectional view of the power tool of FIG. 1, taken along line 2-2 in FIG. 1.

Referring to FIGS. 1 and 2, the impact wrench 10 includes a battery 34 removably coupled to a battery receptacle 38, which in the illustrated embodiment, includes a cavity extending into the handle portion 26. The battery is insertable into and removable from the battery receptacle 38 along a battery axis 39 extending in a length direction of the handle portion 26. The illustrated battery 34 includes battery latches 41 (only one of which is visible in FIG. 1) disposed on opposite lateral sides of the battery 34 to removably couple the battery 34 to the handle portion 26 when the battery 34 is fully inserted into the battery receptacle 38. The illustrated battery latches 41 are configured as resiliently deformable tabs that can be pinched inwardly by a user to decouple the battery 34 from the handle portion 26. In other embodiments, the battery 34 may include one or more spring-biased latches or the like. In some embodiments, the battery 34 includes lithium ion (Li-ion) cells and has a nominal output voltage of 12-Volts; however, batteries with other nominal voltages and/or chemistries may be used in other embodiments.

Referring to FIG. 2, a motor 42 is supported within the motor housing portion 18 and receives power from the battery 34 via connections, pads, and/or battery terminals 43 in the battery receptacle 38 when the battery 34 is coupled to the battery receptacle 38. In the illustrated embodiment, the handle portion 26 of the clamshell halves **28*a*, 28*b* can be covered or surrounded by a grip portion 45, which may be overmolded on the handle portion 26**.

The illustrated motor 42 is a brushless direct current (“BLDC”) motor with a stator 46 and a rotor with an output shaft 50 that is rotatable about an axis 54 relative to the stator 46. The brushless motor 42 may have a nominal diameter of 50 millimeters. In yet other embodiments, other types or sizes of motors may be used. A fan 58 is coupled to the output shaft 50 behind the motor 42 to generate airflow. The impact wrench 10 also includes a trigger 62 (which may include an actuator and a switch) supported by the housing 14 and operable to selectively connect the motor 42 (e.g., via suitable control circuitry provided on one or more printed circuit board assemblies (“PCBAs”) and the battery 34 electrically, to provide DC power to the motor 42.

Figure 3:
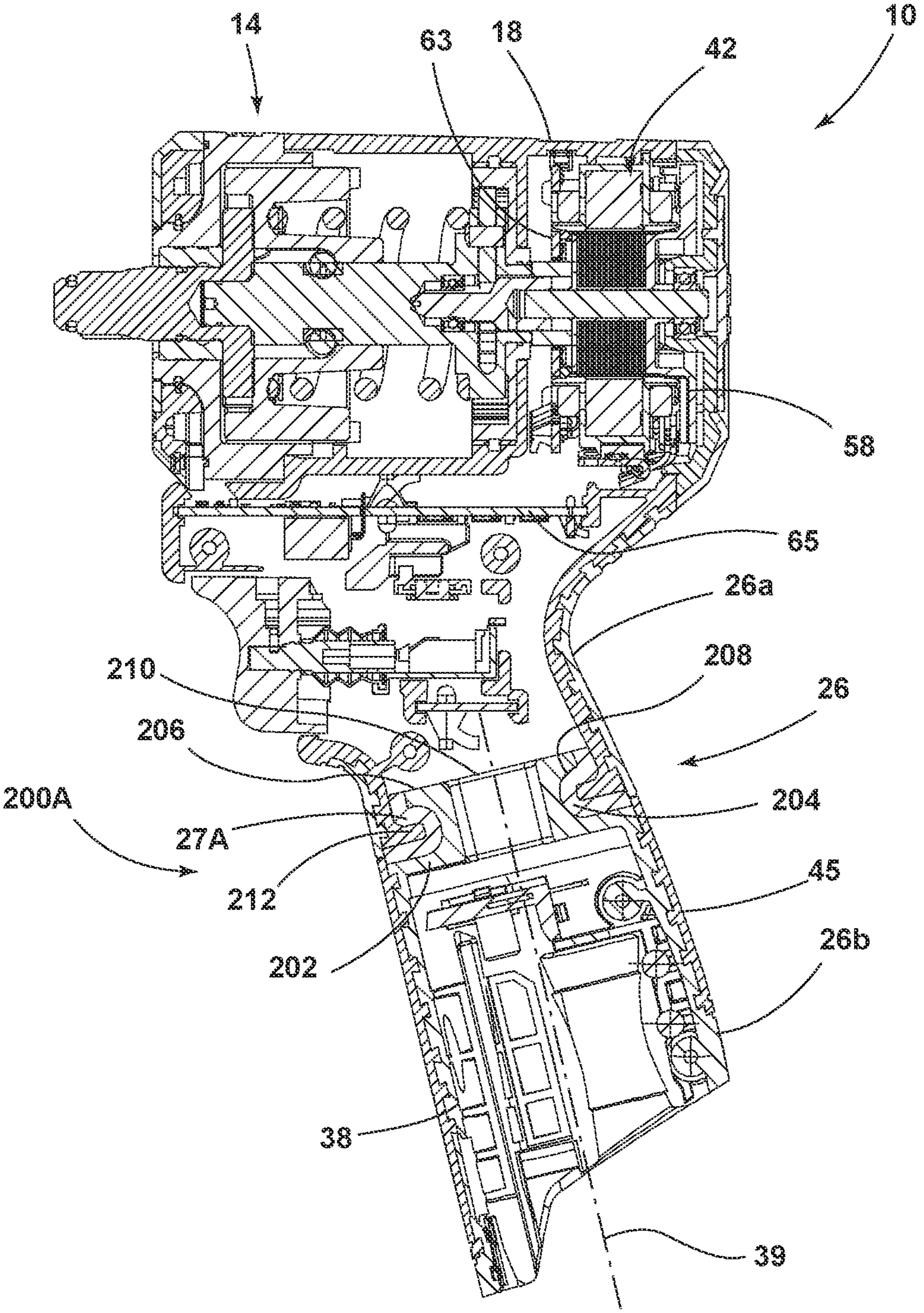
FIG. 3 is a cross-sectional view of a power tool including a battery vibration mitigation system according to another embodiment of the present disclosure.

In the illustrated embodiment, a first PCBA 63 is provided adjacent a front end of the motor 42 (FIG. 3). The illustrated first PCBA 63 includes one or more Hall-Effect sensors, which provide feedback for controlling the motor 42. A second PCBA 65 is positioned within the handle portion 26 (adjacent a top end of the handle portion 26) and generally between the switch 62 and the motor 42. The second PCBA 65 is in electrical communication with the motor 42, the switch 62, and the battery receptacle 38. In the illustrated embodiment, the second PCBA 65 includes a plurality of semi-conductor switching elements (e.g., MOSFETs, IGBTs, or the like) that control and distribute power to windings in the stator 46 in order to cause rotation of the rotor and output shaft 50. The second PCBA 65 may also include one or more microprocessors, machine-readable, non-transitory memory elements, and other electrical or electronic elements for providing operational control to the impact wrench 10. In some embodiments, the first PCBA 63 may be omitted, and the motor 42 may be configured for sensorless control via the second PCBA Referring to FIG. 2, the impact wrench 10 further includes a gear assembly 66 driven by the output shaft 50 and an impact mechanism 70 coupled to an output of the gear assembly 66. The impact mechanism 70 may also be referred to herein as a drive assembly 70. The gear assembly 66 may be configured in any of a number of different ways to provide a speed reduction between the output shaft 50 and an input of the drive assembly 70. The gear assembly 66 is at least partially housed within a gear housing portion 74 that is formed by the housing 14. The clamshell halves **28*a*, 28*b* and the front housing portion 22 collectively define the gear housing portion 74 in the illustrated embodiment. That is, the illustrated impact wrench 10 does not include a separate gear case positioned within the housing 14. Instead, the gear assembly 66—and particularly a ring gear 90 of the gear assembly 66—is directly supported by the clamshell halves 28*a*, 28*b*. However, the gear assembly 66** may be housed and supported in other ways in other embodiments.

The illustrated gear assembly 66 includes a pinion gear 82 coupled to the output shaft 50 of the motor 42, a plurality of planet gears 86 meshed with the pinion gear 82, and the ring gear 90, which is meshed with the planet gears 86 and rotationally fixed within the housing 14 (specifically, within the gear housing portion 74). A rearward facing side of the ring gear 90 is seated against a dividing wall 113 formed by the clamshell halves **28*a*, 28*b* (FIG. 3). The dividing wall 113 separates the interior of the gear housing portion 74 from the motor 42**.

The planet gears 86 are coupled, via pins 88, to a camshaft 94 of the drive assembly 70 such that the camshaft 94 acts as a planet carrier. Accordingly, rotation of the output shaft 50 rotates the planet gears 86, which then advance along the inner circumference of the ring gear 90 and thereby rotates the camshaft 94. In the illustrated embodiment, the camshaft 94 includes a bore 96 extending partially through the camshaft 94 along the axis 54. The bore 96 is shaped to accommodate and/or receive at least a portion of the pinion gear 82. In the illustrated embodiment, the bore 96 extends only partially through the length of the camshaft 94; however, the bore 96 may extend through the entire length of the camshaft 94, to reduce the weight of the camshaft 94, in other embodiments.

The drive assembly 70 of the impact wrench 10 will now be described with reference to FIG. 2. The drive assembly 70 includes an anvil 126, extending from the front housing portion 22, to which a tool element (e.g., a socket, not shown) can be coupled for performing work on a workpiece (e.g., a fastener). The drive assembly 70 is configured to convert the constant rotational force or torque provided by the gear assembly 66 to a striking rotational force or intermittent applications of torque to the anvil 126 when the reaction torque on the anvil 126 (e.g., due to engagement between the tool element and a fastener being worked upon) exceeds a certain threshold. In the illustrated embodiment of the impact wrench 10, the drive assembly 70 includes the camshaft 94, a hammer 130 supported on and axially slidable relative to the camshaft 94, and the anvil 126. As described in greater detail below, the hammer 130 is configured to reciprocate axially along the camshaft 94 and rotate relative to the camshaft 94 to impart periodic rotational impacts to the anvil 126 in response to rotation of the camshaft 94.

The drive assembly 70 further includes a spring 134 that biases the hammer 130 toward the front of the impact wrench 10. In other words, the spring 134 biases the hammer 130 in an axial direction toward the anvil 126, along the axis 54. The camshaft 94 includes cam grooves in which corresponding cam balls 154 are received. The cam balls 154 are in driving engagement with corresponding cam grooves in the hammer 130, and movement of the cam balls 154 within the cam grooves allows for relative axial movement of the hammer 130 along the camshaft 94 when the hammer lugs 146 are engaged with lugs (not shown) on the anvil 126 and the camshaft 94 continues to rotate relative to the hammer 130. The axial movement of the hammer 130 compresses the spring 134, which then releases its stored energy to propel the hammer 130 forward and rotate the hammer 130 once the hammer lugs 146 clear the anvil lugs.

In operation of the impact wrench 10, an operator depresses the switch 62 to activate the motor 42, which continuously drives the gear assembly 66 and the camshaft 94 via the output shaft 50. As the camshaft 94 rotates, the cam balls 154 drive the hammer 130 to co-rotate with the camshaft 94, and the drive surfaces of hammer lugs 146 to engage, respectively, the driven surfaces of anvil lugs to provide an impact and to rotatably drive the anvil 126 and the tool element. After each impact, the hammer 130 moves or slides rearward along the camshaft 94, away from the anvil 126, so that the hammer lugs 146 disengage the anvil lugs.

As the hammer 130 moves rearward, the cam balls 154 situated in the respective cam grooves 150 in the camshaft 94 move rearward in the cam grooves. The spring 134 stores some of the rearward energy of the hammer 130 to provide a return mechanism for the hammer 130. After the hammer lugs 146 disengage the respective anvil lugs, the hammer 130 is propelled forwardly, toward the anvil 126, as the spring 134 releases its stored energy. The hammer 130 rotates as it is propelled forward due to its engagement via the cam balls 154 with the generally helical cam grooves, until the drive surfaces of the hammer lugs 146 re-engage the driven surfaces of the anvil lugs to cause another impact, which in turn transmits torque to the tool element and workpiece.

Operation of the impact wrench 10 may cause vibrations, due to the reciprocating movement of the hammer 130 and the impacts between the hammer 130 and anvil 126. Accordingly, the illustrated impact wrench includes a vibration mitigation system 200 to provide vibration isolation and protection for the battery 34. In some embodiments, the vibration mitigation system 200 may provide isolation and damping between the battery receptacle 38 and at least a portion of the housing 14, including the motor housing portion 18 and front housing portion 22. In some embodiments, the vibration mitigation system 200 may additionally or alternatively provide isolation and damping between the battery 34 and the battery receptacle 38. In some embodiments, including the illustrated embodiment, the vibration mitigation system 200 may provide isolation and damping between at least a portion of the housing 14, including the motor housing portion 18 and front housing portion 22, and at least part of the handle portion 26 configured to be gripped by a user during operation of the impact wrench 10. In this way, the vibration mitigation system 200 may also reduce vibration transmitted to the user, improving comfort and reducing fatigue.

For example, referring to FIG. 2, in the illustrated embodiment, the handle portion 26 includes an upper portion **26*a* extending from the motor housing portion 18 and a lower portion 26*b* movably coupled to the upper portion 26*a* via the vibration mitigation system 200. The vibration mitigation system 200 includes a damping element 27, which may be made of a vibration damping material, such as an elastomeric material, a foam material, or the like. In some embodiments, the damping element 27 may be generally ring-shaped. In the illustrated embodiment, the damping element 27 is received in a gap between the upper and lower portions 26*a*, 26*b* and covered by the overmolded grip portion 45. In yet other embodiments, the damping element 27 may be integrally formed as a single piece with the overmolded grip portion 45** (i.e., during the grip overmolding process).

The damping element 27 at least partially isolates the lower portion **26*b* of the handle portion 26 from the upper portion 26*a* and thereby inhibits transmission of vibration from the upper portion 26*a* to the lower portion 26*b*. The battery receptacle 38 is located in the lower portion 26*b*, such that the battery 34 is coupled to and supported by the lower portion 26*b*. As such, the vibration mitigation system 200, including the damping element 27, is configured to isolate the battery 34 and battery receptacle 38 from vibrations produced during operation of the impact wrench 10**.

FIGS. 3-4 illustrate a vibration mitigation system 200A according to another embodiment and which may be incorporated into the impact wrench 10 described above. In the illustrated embodiment, the lower portion **26*b* of the handle portion 26 includes an upper wall 202, an extension 204 extending parallel to the battery axis 39 from the upper wall 202, and a flange 206 extending radially outwardly from an end of the extension 204 in a direction parallel to the upper wall 202, such that a recess 208 is defined between the upper wall 202 and the flange 206 (FIG. 3). A through-hole 210 extends centrally through the upper wall 202, the extension 202, and the flange 206. Electrical wires (not shown) connecting the battery terminals 43 to the second PCBA 65 may extend through the through-hole 210**.

In some embodiments, the through-hole may also permit the passage of a cooling airflow generated by rotation of the fan 58. In such embodiments, the cooling airflow may be drawn into the housing 14 through the battery receptacle 38 and the through-hole 210; or, the cooling airflow may be exhausted from the housing 14 via the through-hole 210 and the battery receptacle 38. The cooling airflow may pass over the first PCBA 63, the second PCBA 65, and the motor 42 before being exiting the housing 14.

With continued reference to FIGS. 3-4, the upper portion **26*a* of the handle portion 26 in the illustrated embodiment includes an inwardly-extending shoulder 212 (e.g., having an annular shape), which is received within the recess 208 between the upper wall 202 and the flange 206. A damping element 27A, which may be made of a vibration damping material, such as an elastomeric material, a foam material, or the like, is positioned within the recess 208 and surrounds the shoulder 212, such that the damping element 27A has a first side engaging the shoulder 212 and surrounding portions of the upper housing portion 26***a*, and a second side engaging the flange 206, the extension 204, and the upper wall 202. In some embodiments, the upper portion 26*a* may include the recess 208, and the lower portion 26*b* may include the shoulder 212.

In some embodiments, the damping element 27A may be integrally formed as a single piece with the overmolded grip portion 45 (i.e., during the grip overmolding process). In some embodiments, the damping element 27A may be separately formed and sleeved over the flange 206 and extension 204. As shown in FIG. 4, the illustrated damping element 27A includes a plurality of circumferentially-spaced ribs 214 with recesses or gaps between adjacent ribs 214, which may enhance the flexibility and vibration damping performance of the damping element 27A.

The damping element 27A at least partially isolates the lower portion 26*b* of the handle portion 26 from the upper portion 26*a* and thereby inhibits transmission of vibration from the upper portion 26*a* to the lower portion 26*b*. The battery receptacle 38 is located in the lower portion 26*b*, such that the battery 34 is coupled to and supported by the lower portion 26*b*. As such, the vibration mitigation system 200A, including the damping element 27A, is configured to isolate the battery 34 and battery receptacle 38, as well as the user, who may grip the lower portion 26*b* of the handle 26, from vibrations produced during operation of the impact wrench 10 along multiple axes. In particular, the illustrating vibration mitigation system 200A provides vibration damping along the battery axis 39 and, due to the generally circular construction of the damping element 27A, along all directions (360 degrees) perpendicular to the battery axis 39.

Figure 5A:
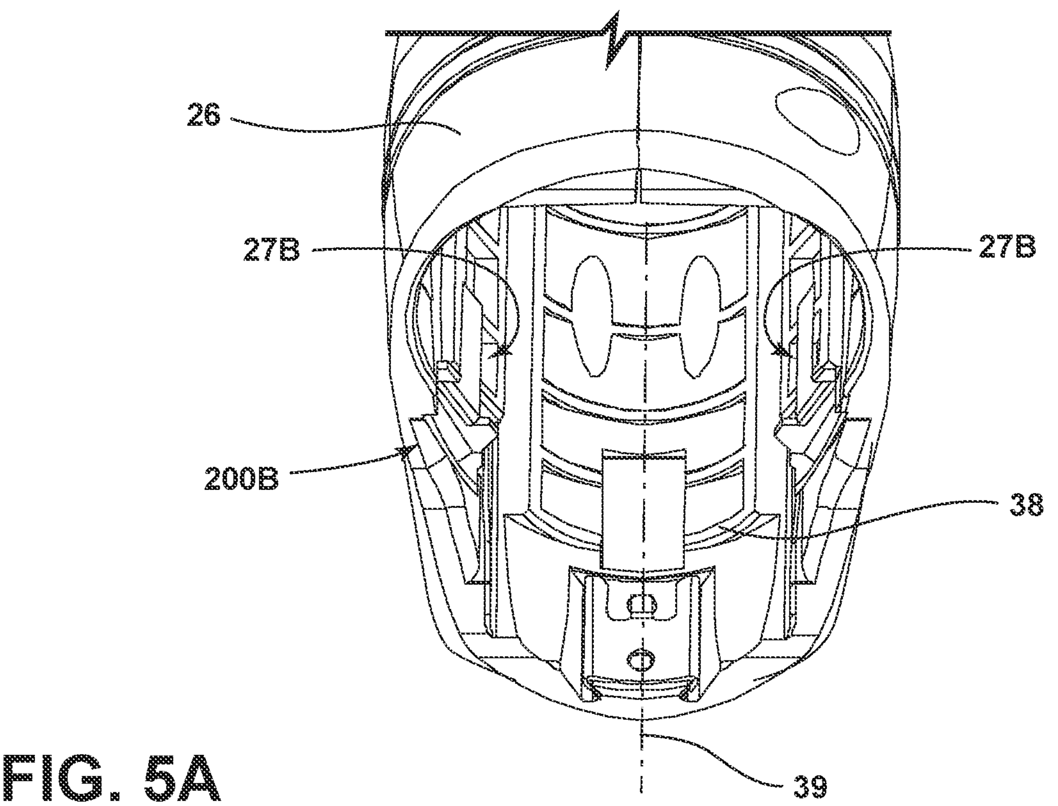
FIG. 5A is a perspective view illustrating a battery vibration mitigation system according to another embodiment, which may be implemented in the power tools of FIGS. 1 and 3.
Figure 5B:
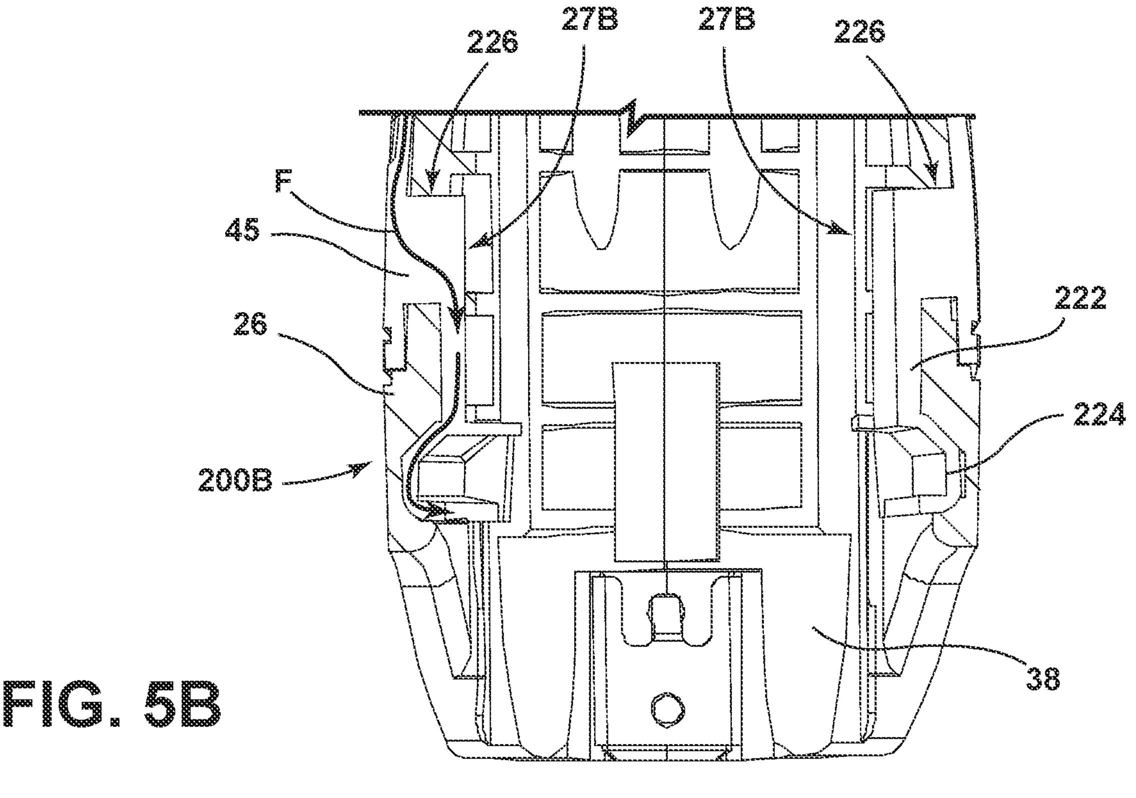
FIG. 5B is a cross-sectional view illustrating molding of a damping element of the battery vibration mitigation system of FIG. 5A.

FIGS. 5A-5B illustrate a vibration mitigation system 200B according to another embodiment and which may be incorporated into the impact wrench 10 described above. In some embodiments, the vibration mitigation systems 200B may be incorporated into the impact wrench 10 in combination with one of the vibration mitigation systems 200, 200A.

The vibration mitigation system 200B includes two damping elements 27B positioned within the handle portion 26 on opposite sides of the battery axis 39 (FIG. 5A). The damping elements 27B are made of a vibration damping material, such as an elastomeric material, a foam material, or the like. Each damping element 27B includes an elongated leg 222 and a hook-shaped recess 224. The elongated legs 222 extend parallel to the battery axis 39, and may be configured (i.e., sized and positioned) to engage lateral sides of the battery 34 when the battery 34 is inserted into the battery receptacle 38. In the illustrated embodiment, the damping elements 27B are integrally formed as a single piece with the overmolded grip portion 45 (i.e., during the grip overmolding process). In particular, as shown in FIG. 5B, the handle portion 26 may include openings 226 that allow the material of the grip portion 45 to flow from outside the handle portion 26 to inside the handle portion 26 to form the damping elements 27B. An exemplary flow path F of the material forming the grip portion 45 and the damping elements 27B during molding is illustrated in FIG. 5B; however, the damping elements 27B may be molded in other ways.

The recesses 224 are configured to receive ends of the latches 41 (FIG. 1) on the battery 34. The illustrated vibration mitigation system 200B thus provides vibration isolation and damping between the battery 34—including both the housing and latches 41 of the battery 34—and the battery receptacle 38. This may reduce rattling of the battery 34 and also inhibit inadvertent disengagement of the latches 41 from the battery receptacle 38 due to vibrations. Forces acting on the latches 41 due vibration are also reduced, which may reduce wear and improve the service life of the latches 41.

Figure 6A:
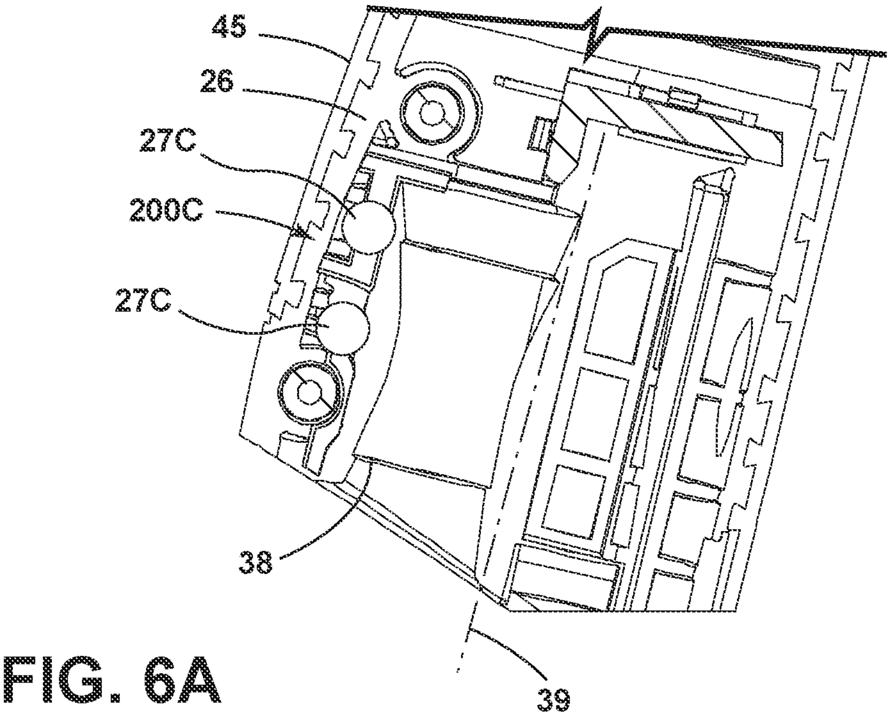
FIG. 6A is a cross-sectional view illustrating a battery vibration mitigation system according to another embodiment, which may be implemented in the power tools of FIGS. 1 and 3.

FIG. 6A illustrates a vibration mitigation system 200C according to another embodiment and which may be incorporated into the impact wrench 10 described above. In some embodiments, the vibration mitigation system 200C may be incorporated into the impact wrench 10 in combination with one or more of the vibration mitigation systems 200, 200A, 200B.

The illustrated vibration mitigation system 200C includes two damping elements 27C positioned within the handle portion 26 along a rear side of the battery receptacle 38. The illustrated damping elements 27C are shaped as cylindrical lugs and extend perpendicular to and offset from the battery axis 39, and the damping elements 27C are spaced from one another in a direction parallel to the battery axis 39. The damping elements 27C are made of a vibration damping material, such as an elastomeric material, a foam material, or the like. In some embodiments, the damping elements 27C may be integrally formed as a single piece with the overmolded grip portion 45 (i.e., during the grip overmolding process). Alternatively, the damping elements 27C may be separately formed and inserted into corresponding recesses or otherwise adhered or affixed within the battery receptacle 38.

The illustrated vibration mitigation system 200C is disposed between a rear side of a housing of the battery 34 and the interior of the battery receptacle 38 when the battery 34 is inserted into the receptacle 38. The damping elements 27C may provide a pre-load on the battery 34, reducing rattling of the battery 34.

Figure 6B:
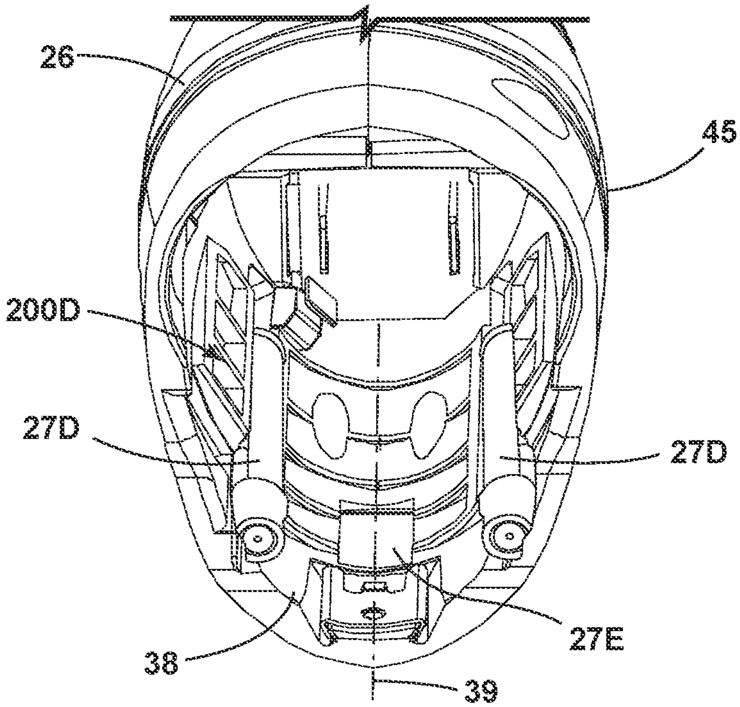
FIG. 6B is a perspective view illustrating a battery vibration mitigation system according to another embodiment, which may be implemented in the power tools of FIGS. 1 and 3.

FIG. 6B illustrates a vibration mitigation system 200D according to another embodiment and which may be incorporated into the impact wrench 10 described above. In some embodiments, the vibration mitigation system 200D may be incorporated into the impact wrench 10 in combination with one or more of the vibration mitigation systems 200, 200A, 200B, 200C.

The illustrated vibration mitigation system 200D includes two damping elements 27D positioned within the handle portion 26 along a front side of the battery receptacle 38. The illustrated damping elements 27D are shaped as cylindrical lugs and extend parallel to and offset from the battery axis 39, and the damping elements 27D are spaced from one another on opposite sides of the battery axis 39. The damping elements 27D are made of a vibration damping material, such as an elastomeric material, a foam material, or the like. In some embodiments, the damping elements 27D may be integrally formed as a single piece with the overmolded grip portion 45 (i.e., during the grip overmolding process). Alternatively, the damping elements 27D may be separately formed and inserted into corresponding recesses or otherwise adhered or affixed within the battery receptacle 38.

The vibration mitigation system 200D may also include an additional damping element 27E in the form of a spring, such as a leaf spring in the illustrated embodiment. The additional damping element 27E is centered relative to the battery axis 39 in the illustrated embodiment.

The illustrated vibration mitigation system 200D is disposed between the housing of the battery 34 and the interior of the battery receptacle 38 when the battery 34 is inserted into the receptacle 38. The damping elements 27D, 27E may provide a pre-load on the battery 34, reducing rattling of the battery 34.

Although the disclosure has been described in detail with reference to certain preferred embodiments, variations and modifications exist within the scope and spirit of one or more independent aspects of the disclosure as described. For example, although the vibration mitigation systems embodying aspects of the present disclosure are described and illustrated herein in the context of the impact wrench 10, such vibration mitigation systems may also be advantageously incorporated into other types of power tools, and particularly power tools producing vibration, including, but not limited to, hammer drills, impact drivers, powered ratchets, rotary hammers, grinders, reciprocating saws, and the like. Various features of the disclosure are set forth in the following claims.

What is claimed is:

1. A power tool comprising:
- a housing including a motor housing portion and a handle portion extending from the motor housing portion;
- a motor supported within the motor housing portion;
- a drive assembly operatively coupled to the motor, the drive assembly producing vibrations during operation of the power tool;
- a battery receptacle located within the handle portion;
- a battery at least partially insertable into the battery receptacle along a battery axis, the battery configured to provide power to the motor; and
- a vibration mitigation system configured to reduce transmission of the vibrations produced by the drive assembly to the battery,
- wherein the handle portion includes an upper portion extending from the motor housing portion and a lower portion movably coupled to the upper portion, and
- wherein the vibration mitigation system includes a damping element between the upper portion and the lower portion.

2. The power tool of claim 1, wherein one of the upper portion or the lower portion includes a recess, and the other of the upper portion or the lower portion includes a shoulder received within the recess.

3. The power tool of claim 2, wherein the damping element surrounds the shoulder.

4. The power tool of claim 2, wherein the recess is defined by an upper wall of the lower portion, an extension extending from the upper wall parallel to the battery axis, and a flange extending outwardly from the extension.

5. The power tool of claim 4, wherein the damping element is disposed between the shoulder on a first side of the damping element, and the upper wall, the extension, and the flange on a second side of the damping element.

6. The power tool of claim 5, further comprising a through-hole extending through the flange, the extension, and the upper wall.

7. The power tool of claim 6, wherein the battery receptacle includes a terminal, wherein the power tool further comprises a printed circuit board assembly, and wherein the terminal is wired to the printed circuit board assembly through the through-hole.

8. The power tool of claim 1, wherein the damping element includes a plurality of circumferentially-spaced ribs.

9. The power tool of claim 1, wherein the vibration mitigation system includes a damping element engageable with the battery.

10. The power tool of claim 1,
- wherein the damping element is configured to dampen vibration in a direction along the battery axis and in all directions perpendicular to the battery axis.

11. The power tool of claim 10, wherein the drive assembly includes a camshaft driven by the motor, a hammer configured to reciprocate along the camshaft in response to rotation of the camshaft, and an anvil configured to receive periodic rotational impacts from the hammer.

12. The power tool of claim 1,
- wherein the damping element is configured to dampen vibration along the battery axis and in a direction perpendicular to the battery axis.

13. A power tool comprising:
- a housing including a motor housing portion and a handle portion extending from the motor housing portion;
- a motor supported within the motor housing portion;
- a drive assembly operatively coupled to the motor, the drive assembly producing vibrations during operation of the power tool;
- a battery receptacle located within the handle portion;
- a battery at least partially insertable into the battery receptacle along a battery axis, the battery configured to provide power to the motor; and
- a vibration mitigation system configured to reduce transmission of the vibrations produced by the drive assembly to the battery,
- wherein the vibration mitigation system includes a damping element engageable with the battery,
- wherein the damping element is engageable with a latch of the battery.

14. The power tool of claim 9, wherein the damping element is made of an elastomeric material.

15. The power tool of claim 9, wherein the handle portion includes an overmolded grip, and wherein the damping element is integrally formed as a single piece with the overmolded grip.

16. The power tool of claim 15, wherein the handle portion includes an opening, and wherein material forming the overmolded grip flows through the opening to form the damping element during molding.

17. A power tool comprising:
- a housing including a motor housing portion and a handle portion extending from the motor housing portion;
- a motor supported within the motor housing portion;
- a drive assembly operatively coupled to the motor, the drive assembly producing vibrations during operation of the power tool;
- a battery receptacle located within the handle portion;
- a battery at least partially insertable into the battery receptacle along a battery axis, the battery configured to provide power to the motor; and
- a vibration mitigation system configured to reduce transmission of the vibrations produced by the drive assembly to the battery,
- wherein the vibration mitigation system includes a damping element engageable with the battery, and
- wherein the damping element includes at least one selected from a group consisting of a cylindrical lug and a leaf spring.

18. The power tool of claim 17, wherein the damping element is elongated in a direction perpendicular to the battery axis.

19. The power tool of claim 17, wherein the damping element is elongated in a direction parallel to the battery axis.

20. A power tool comprising:

a housing including a motor housing portion and a handle portion extending from the motor housing portion;

a motor supported within the motor housing portion;

a drive assembly operatively coupled to the motor, the drive assembly producing vibrations during operation of the power tool;

a battery receptacle located within the handle portion;

a battery at least partially insertable into the battery receptacle along a battery axis, the battery configured to provide power to the motor; and a vibration mitigation system configured to reduce transmission of the vibrations produced by the drive assembly to the battery, wherein the handle portion includes an upper portion extending from the motor housing portion and a lower portion coupled to the upper portion, and wherein the vibration mitigation system includes a damping element between the upper portion and the lower portion, and wherein the damping element includes a plurality of circumferentially-spaced ribs.

* * * * *